US008572019B2

(12) United States Patent
Eggers et al.

(10) Patent No.: US 8,572,019 B2
(45) Date of Patent: Oct. 29, 2013

(54) REDUCING THE DISSIMILARITY BETWEEN A FIRST MULTIVARIATE DATA SET AND A SECOND MULTIVARIATE DATA SET

(75) Inventors: Mitchell Eggers, Mercer Island, WA (US); Eli Drake, Seattle, WA (US)

(73) Assignee: Global Market Insite, Inc., Bellevue, WA (US)

( * ) Notice: Subject to any disclaimer, the term of this patent is extended or adjusted under 35 U.S.C. 154(b) by 645 days.

(21) Appl. No.: 12/764,838

(22) Filed: Apr. 21, 2010

(65) Prior Publication Data
US 2011/0264617 A1 Oct. 27, 2011

(51) Int. Cl.
G06F 15/00 (2006.01)
G06F 15/18 (2006.01)

(52) U.S. Cl.
USPC ........................................................ 706/62

(58) Field of Classification Search
USPC ........................................................ 706/62
See application file for complete search history.

(56) References Cited

U.S. PATENT DOCUMENTS

| 7,155,421 B1 | 12/2006 | Haldar |
| 2003/0055614 A1 | 3/2003 | Pelikan et al. |
| 2004/0093261 A1 | 5/2004 | Jain et al. |
| 2007/0088731 A1 | 4/2007 | Chant et al. |

FOREIGN PATENT DOCUMENTS

WO WO-2011-133551 10/2011

OTHER PUBLICATIONS

M. Last and A. Kandel, "Automated Detection of Outliers in Real-World Data", Intelligent Technologies, Proc. 2nd Int'l Conf. on, 2001 pp. 1-10 (295-301).*
S. Lindamood et al., "Using the Survery of Constumer Finances: Some Methodological Considerations and Issues", J. Consumer Affairs, vol. 41, No. 2, Winter 2007, pp. 195-222.*
D. Page and S. Ray, "Skewing: An Efficient Alternative to Lookahead for Decision Tree Induction", Artificial Intelligence, Proc. 18th Int'l Joint Conf. on, 2003, pp. 1-7.*
S.D. Pietra et al., "Inducing Features of Random Fields", Pattern Analysis and Mach. Intell., IEEE Trans. on, vol. 19, No. 4, Apr. 1997, pp. 380-393.*
International Searching Authority. International Search Report, International Application No. PCT/US2011/033053, mailed Nov. 28, 2011, 3 pages.
International Searching Authority. Written Opinion, International Application No. PCT/US2011/033053, mailed Nov. 28, 2011, 6 pages.
"The ARF Quality Enhancement Process," ORQC Special Meeting, Sep. 29, 2009, 38 pages.

(Continued)

*Primary Examiner* — Kakali Chaki
*Assistant Examiner* — Vincent Gonzales
(74) *Attorney, Agent, or Firm* — Perkins Coie LLP (57) ABSTRACT

A categorization data structure is described that relates to two groups of individuals. For each of two or more categories, the data structure contains (1) information identifying individuals of the first group assigned to the category, and (2) information identifying individuals of the second group assigned to the category. For each category, the information can be used to adjust the individuals of the first group assigned to the category based upon comparing the proportion of all of the individuals of the second group that are assigned to the category to the proportion of all of the individuals of the first group that are assigned to the category.

36 Claims, 8 Drawing Sheets

(56) References Cited

OTHER PUBLICATIONS

"Sample Blending: A New Approach," CASRO Panel Conference, 2010, 20 pages.

Lorch J.. et al., "Sample Blending: 1+1 > 2," Survey Sampling International Whitepaper, Feb. 2010, 10 pages.

MarketTools, Inc., "MarketTools TrueSample," <http://www.markettools.com/pdfs/resources/DS_TrueSample.pdf>, internet accessed on Mar. 29, 2010, 3 pages.

MarketTools, Inc., "TrueSample," <http://www.markettools.com/TrueSample/>, internet accessed on Mar. 29, 2010, 2 pages.

Mktg Inc., "Consistent Track," <http://surv.mktginc.com/mktgV2/interior.asp?p=3>, internet accessed on Mar. 29, 2010, 2 pages.

Mktg Inc., "The Grand Mean Project," <http://surv.mktginc.com/mktgV2/interior.asp?p=1>, internet accessed on Mar. 29, 2010, 2 pages.

Mktg Inc., "Optimum Blending Solutions," <http://surv.mktginc.com/mktgV2/interior.asp?p=2>, internet accessed on Mar. 29, 2010, 2 pages.

Walker, R., et al., "ARF Foundations of Quality, Results Preview," The ARF 55th Annual Convention + Expo, 2009, 58 pages.

* cited by examiner

FIG. 3 subject dataset 300

| userid | sex | region | age | ethnicity | ... | enjoy animated films | enjoy The Incredibles | tolerant of violence in animated films |
|---|---|---|---|---|---|---|---|---|
| 8001 | F | East | 27 | Latino | | yes | no | no |
| 8002 | M | North | 35 | East Asian | | no | no | yes |
| 8003 | M | West | 25 | Native American | | yes | yes | yes |
| 8004 | F | South | 37 | East Asian | | no | yes | no |
| ... | | | | | | | | |
| 8400 | F | West | 22 | African American | | yes | yes | no |
| 400 | M: 54.3<br>F: 45.7 | East: 27.9<br>North: 22.1<br>South: 23.5<br>West: 26.5 | 18: 3.2<br>18: 1.3<br>20: 2.8<br>22: 0.4<br>... | African American: 3.1<br>East Asian: 12.4<br>European: 1.7<br>Latino: 11.2<br>... | | yes: 88.6<br>no: 11.4 | yes: 73.1<br>no: 26.9 | yes: 52.7<br>no: 47.3 |

301 302 303 304 305 306 307 308 309
311 312 313 314 315 320 reference dataset 350

| userid | sex | region | age | ethnicity | ... |
|---|---|---|---|---|---|
| 3001 | M | North | 18 | East Asian | |
| 3002 | M | West | 45 | East Asian | |
| 3003 | F | North | 26 | White | |
| ... | | | | | |
| 3750 | M | South | 19 | European | |
| 750 | M: 61.3<br>F: 38.7 | East: 26.1<br>North: 23.7<br>South: 27.2<br>West: 23.0<br>... | 18: 4.4<br>19: 2.6<br>20: 0.7<br>22: 1.7<br>... | African American: 5.1<br>East Asian: 6.3<br>European: 2.2<br>Latino: 19.0<br>... | |

| major column 350 | | minor columns 550 | | | | | |
|---|---|---|---|---|---|---|---|
| | region | region=East | region=North | region=South | region=West | region=East or North | region=East or South | region=East or West |
| 361 | East | 1 | 0 | 0 | 0 | 1 | 1 | 1 |
| 362 | North | 0 | 1 | 0 | 0 | 1 | 0 | 0 |
| 363 | West | 0 | 0 | 0 | 1 | 0 | 0 | 1 |
| 364 | South | 0 | 0 | 1 | 0 | 0 | 1 | 0 |
| 365 | ... | | | | | | | |
| 366 | West | 0 | 0 | 0 | 1 | 0 | 0 | 1 |
| 370 | East: 27.9<br>North: 22.1<br>South: 23.5<br>West: 26.5 | 27.9 | 22.1 | 23.5 | 26.5 | 50.0 | 51.4 | 54.4 |
| | | 501 | 502 | 503 | 504 | 505 | 506 | 507 |

REDUCING THE DISSIMILARITY BETWEEN A FIRST MULTIVARIATE DATA SET AND A SECOND MULTIVARIATE DATA SET

TECHNICAL FIELD

The described technology is directed to the field of manipulating data sets, such as data sets corresponding to attributes and/or responses of survey respondents.

BACKGROUND

In order to evaluate and guide the design and promotion strategy for a product or service, many companies use market research surveys. In a market research survey, a set of questions is posed to each of a number of people, called "respondents." Survey questions are often directed to the respondent's personal tastes, behaviors, and preferences as they relate to the product or service. The responses to a survey's questions, aggregated across its respondents, is typically used as an estimate of how a much larger population, such as the population of all possible customers for the product or service in a particular geographic region, would in the aggregate answer the survey's questions. The extent to which this estimate is accurate is sometimes referred to as the level of representativeness of the survey's responses.

Because it is generally not possible to measure the level of representativeness of a survey's responses, it is common to use the level of representativeness of identifiable attributes of a survey's respondents as a proxy for the level of representativeness of the survey's responses. As one example, for a survey that is to represent the tastes, behaviors, and preferences of the population of a particular geographic region, it would be typical to seek a number of respondents residing in each subregion of the geographic region (such as each state, ZIP code, or area code) that is proportional to the total number of people residing in the subregion. In this way, the distribution of different values of the subregion variable for the set of respondents would match the distribution of different values of the subregion variable for the population of the region.

BRIEF DESCRIPTION OF THE DRAWINGS

FIG. 3 is a table diagram showing sample contents of a subject data set and a reference data set.

DETAILED DESCRIPTION

The inventors have recognized that in some cases it is not possible to control the geographic subregions of the respondents, as is often true for surveys presented online. The inventors have also recognized the desirability of providing survey results that are highly representative of arbitrarily-selected sets of respondent attributes; even in cases where it is possible to control the geographic subregions of the respondents, other important attributes of these respondents are often skewed.

Accordingly, a software and/or hardware facility for reducing the dissimilarity of a first multivariate data set—called the "subject data set"—with a second multivariate data set—called the "reference data set"—("the facility") is described. As an example, in some embodiments, the facility adapts a subject data set representing the distributions of each of a number of attributes among a set of actual survey respondents to minimize its dissimilarity with a reference data set representing the distributions of attributes in a modeled population. The facility can then proceed to use these adaptations of the first data set to transform survey responses received from the set of actual respondents into the survey responses that would be expected from a set of respondents whose attribute distributions closely matched the attribute distributions of the modeled population. For example, the facility can be used to transform survey responses received from a first source into those that would be expected from a second source such as Global Market Insite, Inc. of Bellevue, Wash. ("GMI"), or into those that would be expected from respondents to such generalized surveys as the U.S. Census or the National Opinion Research Center's General Social Survey ("GSS").

In some embodiments, the facility minimizes a measure of dissimilarity between data sets that takes into account both each variable's "marginal distribution" in each data set—that is, its distribution standing alone—and each variable's "interrelationship" with every other variable in each data set—the degree to which a change in one variable's distribution is associated with a change in another variables distribution.

In some embodiments, the facility constructs a decision tree that specifies how attribute distributions are to be partitioned for both the reference and subject data sets and adjusts the observations within each partition of the subject data set to produce a meaningful reduction in the total dissimilarity between the adjusted subject data set and the reference data set, such as a maximum reduction. In various embodiments, the facility uses various approaches to construct decision trees, including fully-automated approaches such as an exhaustive approach and a progressive Monte Carlo approach, as well as partially-automated approaches such as those that permit a human user to specify a portion of the decision tree. In some embodiments, the decision tree is a binary tree in which each interior node corresponds to a single attribute, or "variable" and has two children: a first child that corresponds to one proper subset of the possible values of the variable, and a second child that corresponds to all the remaining possible values of the same variable. Respondents, also called "observations," are said to be mapped to a given node of the tree if they satisfy all of the conditions imposed by the nodes of the tree that are on the path from the root node of the tree to the node in question. In particular, each observation is said to map to a single leaf node of the tree.

In some embodiments, the facility uses the decision tree as a basis for weighting survey responses from actual respondents based upon the identity of the leaf node of the decision tree to which each respondent corresponds. In some embodiments, the facility uses the decision tree as a basis for soliciting and/or accepting survey responses from actual respondents based upon the identity of the leaf of the decision tree to which each respondent corresponds.

In some embodiments, the facility uses the decision tree that it constructs to profile the attribute distribution of a source of survey responses. As additional responses are received from the source, the facility monitors for significant deviation in the proportion of new responses mapped to each leaf node by the decision tree and, if it detects significant deviation from the proportions of responses from the source mapped to the leaf node, triggers a warning and may trigger the generation of a new decision tree for the source.

In some embodiments, the facility uses its comparison of actual respondents to model populations in order to identify sets of actual respondents that are complementary, i.e., actual respondent sets whose members can be aggregated to more closely match the attribute distributions of the modeled population.

In some embodiments, the facility applies the described techniques in order to balance two groups of respondents with respect to a specified set of attributes, such as respondents who are candidates for testing and control groups in medical clinical trials.

By operating in some or all of the ways described above, embodiments of the facility provide significant benefits relative to conventional techniques.

Figure 1:
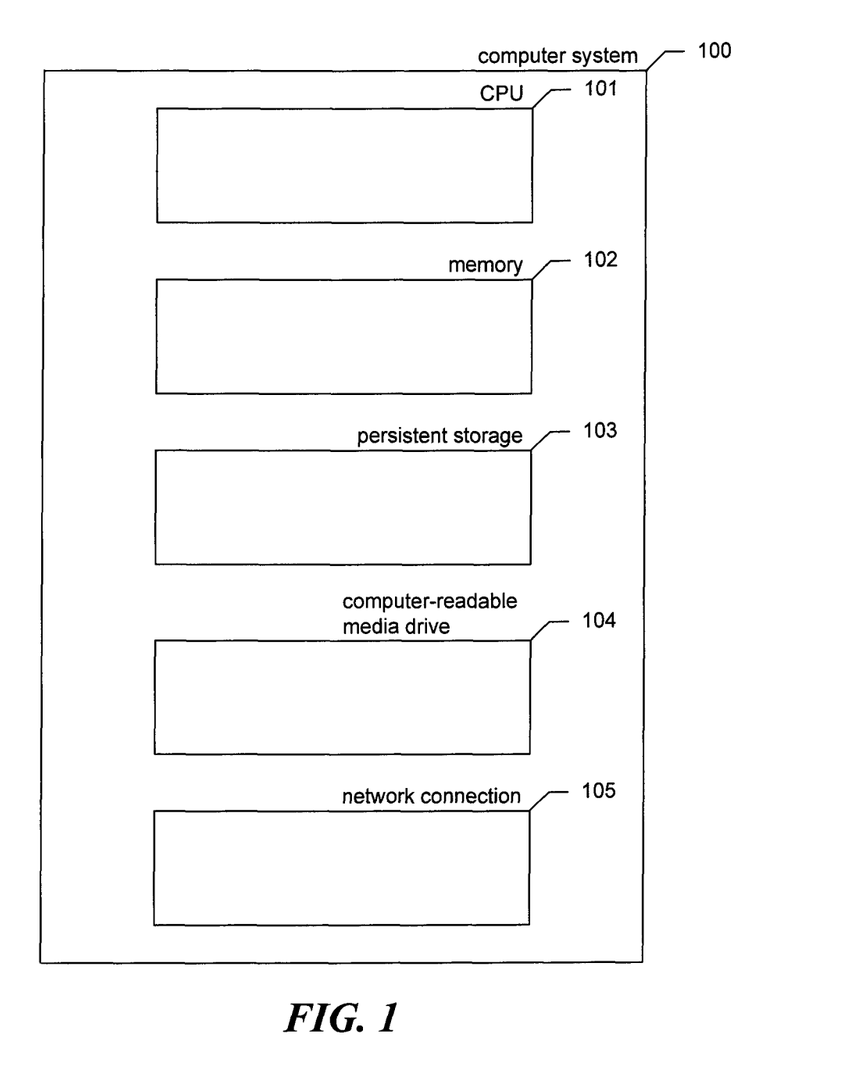
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including a multithreaded program being tested, a debugger, the facility, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware. While computer systems configured as described above are typically used to support the operation of the facility, those skilled in the art will appreciate that the facility may be implemented using devices of various types and configurations, and having various components.

Figure 2:
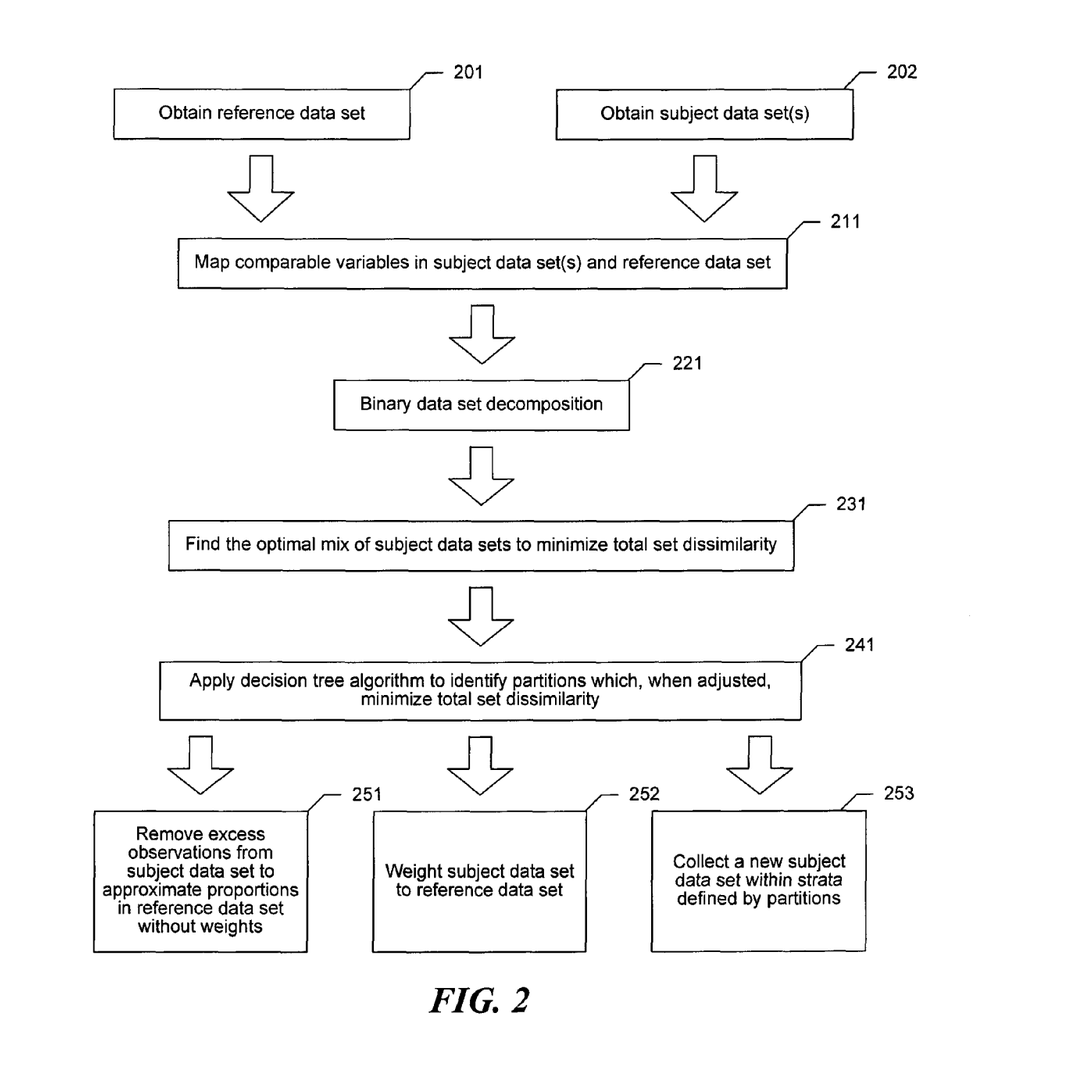
FIG. 2 is a flow diagram showing steps typically performed by the facility in some embodiments to reduce the dissimilarity of a subject data set with a reference data set.

FIG. 2 is a flow diagram showing steps typically performed by the facility in some embodiments to reduce the dissimilarity of a subject data set with a reference data set. Those skilled in the art will appreciate that the steps shown in FIG. 2 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

In steps 201 and 202, facility collects, reads, loads, or otherwise obtains a reference data set and one or more subject data sets, respectively. Each data set contains, for each of a number of respondents, values for each of a set of respondent attributes, or "variables," such as age, gender, geographic region, church attendance, belief in death penalty, voting behavior etc., which exist within an N dimensional sample space $S^N = \{S_1, S_2, \ldots, S_N\}$. The N dimensional sample space $S^N = \{S_1, S_2, \ldots, S_N\}$ is the set of all possible values of all variables in combination.

For example, if we have 2 variables where variable 1 is gender and variable 2 is region, then $S_1 = \{Male, Female\}$ is the set of all possible values that variable 1 can have and $S_2 = \{North, East, South, West\}$ is the set of all possible values that variable 2 can have.

$$S^2 = \{S_1, S_2\} = \left\{\frac{Male}{North}, \frac{Male}{East}, \frac{Male}{South}, \frac{Male}{West}, \frac{Female}{North}, \frac{Female}{East}, \frac{Female}{South}, \frac{Female}{West}\right\}$$

is the set of all possible values that both variables could have in combination. This can be determined before the data is collected. Said another way, $S_1, S_2, \ldots$ is the list of variables that define the sample space, the domain within which the facility produces one data set (a subject) such that it matches the reference data set by minimizing the dissimilarity across all of the $S_1, S_2, \ldots$ dimensions).

If variable 1 is age, then $S_1$ is the set of all possible values that age may take on. If variable 2 is gender, then $S_2$ is the set of all possible gender values, i.e. $S_2 = (Male, Female)$.

The facility employs two vectors of probability mass functions of length N corresponding to the $n^{th}$ dimension of $S^N$: $f^N = \{f_1, f_2, \ldots, f_N\}$ and $g^N = \{g_1, g_2, \ldots, g_N\}$. $f^N = \{f_1, f_2, \ldots, f_N\}$ is the distribution of all the variables in the reference data set and $g^N = \{g_1, g_2, \ldots, g_N\}$ is the distribution of all the variables in the subject data set. For this example and ease of explication, consider a data set created using the GMI panel as the reference and create the subject data set from an alternative outside source that matches the GMI reference (i.e. minimal total data set dissimilarity).

If variable 2 is gender, then $f_2$ is the function that gives the percentage of respondents in the reference data set who are either male or female. For example, consider the distribution of the gender variable in the reference data set of $f_2$ (Male)= 60% and $f_2$(Female)=40%. Likewise, $g_2$ is the function which returns the percentage of respondents in the subject data set who are either male or female. In the example, the distribution of the gender variable in the subject data set is $g_2$ (Male)=55% and $g_2$ (Female)=45%. In some embodiments, the facility estimates the F and G functions based on the subject and reference data sets.

FIG. 3 is a table diagram showing sample contents of a subject data set and a reference data set. The reference data set 350 contains, for each of number of respondents among a modeled population, the respondent's values for a number of variables, such as demographic variables. In particular, each of rows 361-364 corresponds to a different respondent. The respondent to whom the row corresponds is identified in a user ID column 301. Each row further contains values for sex, region, age, and ethnicity variables, among others, in corresponding columns 302-306. For example, row 361 indicates that the respondent having user ID 3001 is male, from a North region, of age 18, and is East Asian. Also shown for the reference data set are aggregated values 370 for each of the variables, also referred to herein variously as the "frequency distribution," "probability distribution," or "attribute distribution" for the variable. This portion of the table shows, in column 301, the total number of respondents represented, and in columns 302-306 the attribute distribution among all the reference respondents for the variable. As an example, row 370 indicates that there are 750 respondents in the reference data set, 61.3 percent of which are male and 38.7 percentage of which are female.

FIG. 3 further shows a subject data set 300. The rows 311-315 of the subject data set table each correspond to a respondent in the subject data set, and section 320 shows attribute distributions for variables within the subject data set. Columns 301-306 of the subject data set table closely parallel the same columns of the reference data set table. The subject data set table further contains columns 307-309 containing responses by the same respondents to questions of a market research survey posed to the respondents in the subject data set. For example, row 311 indicates that the respondent in the subject data set having user ID 8001 enjoys animated films, enjoys The Incredibles, and is not tolerant of violence in animated films.

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be indexed, compressed, and/or encrypted in ways not shown; etc.

Returning to FIG. 2, in step 211, the facility maps comparable variables between the reference data set and the collected subject data set or data sets. In some embodiments, step 211 involves receiving input from a human user who performs the mapping. In some embodiments, the facility performs the mapping automatically, such as by using standardized variable codes, natural language matching techniques, etc.

In step 221, the facility decomposes each variable into its complete set of unique binary combinations, where a binary combination maps the variable's categories to create only two categories. For example, if the variable is region, measured as East, West, South, and North, then its has a set of 7 unique binary combinations:

1) East/all other regions
2) West/all other regions
3) South/all other regions
4) North/all other regions
5) East and West/South and North
6) East and South/West and North
7) East and North/West and South The number of unique binary combinations for a variable with N categories is:

$$\left[\sum_{z=1}^{\lfloor \frac{n}{2} \rfloor} \frac{n!}{(n-z)!z!}\right] - (n+1 \bmod 2)\frac{n!}{2(n-z)!z!}$$

If geographic location were measured in 15 census regions, the number of binary combinations is 16,383.

Figure 4:
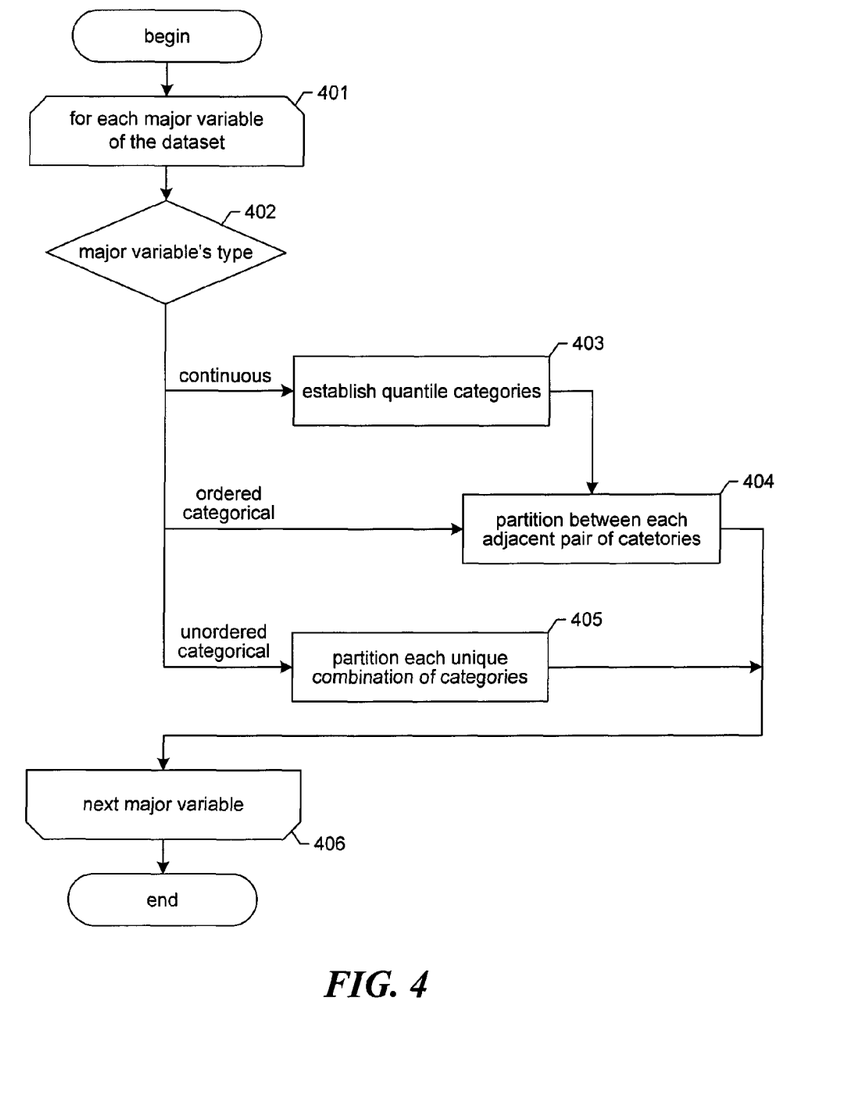
FIG. 4 is a flow diagram showing steps typically performed by the facility in some embodiments to decompose each major variable that is in both the reference and subject data sets into its complete set of unique binary combinations, also called minor variables.

FIG. 4 is a flow diagram showing steps typically performed by the facility in some embodiments to decompose each major variable that is in both the reference and subject data sets into its complete set of unique binary combinations, also called minor variables. The variables contained in the data sets as shown in FIG. 3 are sometimes referred to herein as "major variables." In contrast, as is discussed in greater detail below, the facility treats each of the unique binary combinations into which each major variable is decomposed "minor variable." In steps 401-406, the facility loops through each of N major variables $X_1, X_2, \ldots, X_N$. In step 402, the facility branches based upon the type of the major variable: where the major variable is a continuous variable, the facility continues in step 403; where the major variable is an ordered categorical variable, the facility continues in step 404; and where the major variable is an unordered categorical variable, the facility continues in step 405. In step 403, where the major variable is a continuous variable, the facility establishes a number of different quantile categories, such as 100 different percentile categories. For percentile categories, for example, the facility first determines 101 percentile values for the variable. $\pi_0, \pi_{0.01}, \pi_{0.02}, \ldots, \pi_1$. The facility then determines 100 percentile categories $C_i$ where $\pi_0 \le C_1 < \pi_{0.01}$, $\pi_{0.01} \le C_2 < \pi_{0.02}, \ldots, \pi_{0.99} \le C_{100} \le \pi_1$. After step 403, the facility continues in step 404.

In step 404, where the major variable is an ordered categorical variable or has been converted in step 403 to an ordered categorical variable, the facility partitions the variable between each pair of categories that is adjacent in the order. That is, where $X_i$ is ordered categorical with categories $C_1, C_2, \ldots, C_n$, the facility decomposes $X_i$ into n−1 variables defined as $$X_{i_z} = \begin{cases} 1 & X_i \le C_z \\ 0 & X_i > C_z \end{cases}$$

for z=1 to n−1. After step 404, the facility continues in step 406.

In step 405, where the major variable is an unordered categorical variable, the facility partitions each unique combination of categories. That is, for unordered categorical variable $X_i$ with categories $C_1, C_2, \ldots, C_n$ the facility decomposes $X_i$ into $$\left[\sum_{z=1}^{\lfloor \frac{n}{2} \rfloor} \frac{n!}{(n-z)!z!}\right] - (n+1 \bmod 2)\frac{n!}{2(n-z)!z!}$$

variables defined as $$X_{i_z} = \begin{cases} 1 & X_i = C'_z \\ 0 & X_i \ne C'_z, \end{cases}$$

where $C_z'$ represents the $z^{th}$ combination of $C_1, C_2, \ldots, C_n$. After step 405, the facility continues in step 406. In step 406, if additional major variables remain to be processed, then the facility continues in step 401 to process the next major variable, else the steps conclude. This approach creates an exhaustive set of all unique binary combinations taking into consideration ordered and non-ordered variable types.

Figure 5:
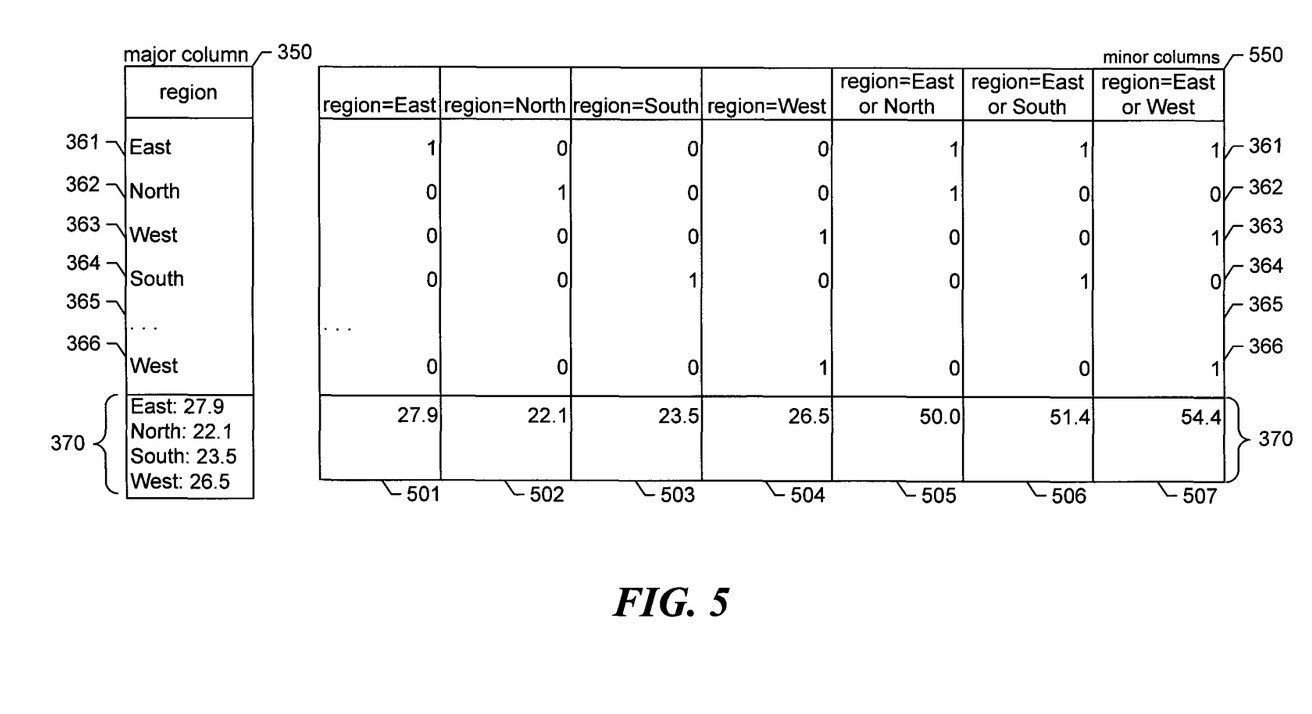
FIG. 5 is a table diagram showing the result of decomposing a sample major variable into minor variables.

FIG. 5 is a table diagram showing the result of decomposing a sample major variable into minor variables. FIG. 5 shows major column 303 containing values for the major variable region that corresponds to column 303 as shown in FIG. 3. FIG. 5 further includes minor columns 501-507, each of which contains values for one of the minor variables into which the facility decomposes the major variable region. As an example, minor column 501 contains a 1 for each respondent in the East region, and a 0 for each respondent in the North, South or West region. As another example, column 507 contains a 1 for each respondent in the East region or West region, and a 0 for each respondent in the North region or South region. It is minor columns like these, corresponding to minor variables, that will be included in each interior node of the decision tree later generated by the facility.

Returning to FIG. 2, in step 231, where multiple subject data sets were collected in step 202, the facility identifies an optimal mix of the multiple subject data sets to minimize total set dissimilarity between the combined subject data sets and the reference data set. In some embodiments, step 231 involves determining, for each of the multiple subject data sets, a weight that is 0 or larger that determines the relative level of influence of the individual subject data set on the combined subject data sets. In some embodiments, the facility uses a particle swarm optimization algorithm to experimentally establish the weights used to combine the subject data sets. The measure of total set dissimilarity used by the facility is described in the following discussion.

G is a real valued function which measures the dissimilarity of two probability distributions on the same sample space (i.e., proportionate age distribution in reference data set compared to proportionate age distribution in subject data set). H is a real valued function which measures the dissimilarity of two interactions or dissimilarity of interrelatedness on the same sample space (i.e., relationship of age distribution to marital status distribution in the reference compared to the relationship of age distribution to marital status distribution in subject data set).

The marginal dissimilarity for the $n^{th}$ variable is defined as:

$$M_n = G(f_n, g_n)$$

That is, $M_n$ is used as a shorthand label for the function G on the $n^{th}$ variable.

The interaction dissimilarity for the $n^{th}$ and $m^{th}$ variable is defined as:

$$I_{n,m} = H(f_n | f_m, g_n | g_m)$$

where, for example, if n is region and m is ethnicity, $f_n | f_m$ represents the interaction of the region variable with the ethnicity variable in the reference data set, and $g_n | g_m$ represents the interaction of the region variable with the ethnicity variable in the subject data set. $I_{n,m}$ is used as a shorthand label for the function H on the $n^{th}$ and $m^{th}$ variables, respectively.

Then, given two real valued functions $Y_1$ over m and $Y_2$ over n, and a norm on a two dimensional vector space, the total set dissimilarity is defined as:

$$T = Y_2(\|M_n, Y_1(I_{n,m})\|)$$

In this equation, $Y_1$ is typically the average function, and if the $n^{th}$ variable is age, then T represents the average dissimilarity of the age distribution interaction with all other variables in the reference compared to the age distribution interaction with all other variables in the subject data set.

If $Y_1$ is the average function, then $Y_1(I_{n,m})$ represents the average dissimilarity of the age distribution interaction with marital status, age distribution interaction with employment status, age distribution interaction with church attendance, age distribution interaction with foreign born, etc. In various embodiments, $Y_1$ is the average, maximum, median, $75^{th}$ percentile, or the root mean square of the interaction dissimilarities.

Recall from above that $M_n$ is the dissimilarity of two probability distributions of the same variable (e.g., age, marital status, church attendance, etc.), so it is possible to plot each variable's dissimilarity by its marginal distribution difference and its interaction difference. Where there are no differences, a (0,0) places the point at the origin of a Euclidian plane. If, for example, the marginal distribution difference between the reference and subject is significantly different, but the average interaction difference is only slightly different, the point might be plotted at (10, 1). A variable with a large difference in both its marginal distribution and its interaction distance might be plotted at (10, 10).

While Euclidian space is used for the foregoing example, any definition of space and distance can be used. The vertical parallel bars indicate any norm can be used to define distance in space.

Continuing with 2-dimensional Euclidian space, the facility determines the distance from the plotted point to the origin using the Pythagorean theorem for distance, $$C = SQRT(x^2 + y^2).$$

In some embodiments, $Y_2$ is the average distance from the origin (0, 0) of all variables plotted in this (x, y) space. In various embodiments, various other summary measures are used.

Thus, T is the total multi-dimensional dissimilarity of the subject data set from the reference data set, which takes into account both the differences in the proportionate distribution of all variables and the interaction differences among all the variables.

The measurement equation further comprises a specific form of the total data set dissimilarity index in which the dissimilarity between two sets is based on the Kullback-Leibler divergence ("K-L divergence") measure combined with the mutual information index and an algebraic direction modifier such that the combination of these terms measure the total data set dissimilarity between two data sets.

Given two discrete probability distributions ($X_1$ and $X_2$) with n categories defined on the same sample space, the K-L divergence of $X_1$ (subject distribution) from $X_2$ (reference distribution) is defined as:

$$KL(X_1, X_2) = \sum_{i=1}^{n} P(X_{2_i}) \log_2 \left( \frac{P(X_{2_i})}{P(X_{1_i})} \right)$$

This is G—the proportionate distribution difference.

Given two discrete probability distributions ($X_1$ and $X_2$) and their joint distribution, the mutual information between $X_1$ and $X_2$ is defined as the K-L divergence of the product of the marginal distributions from the joint distribution:

$$I(X_1, X_2) = \sum_{i=1}^{n} P(X_{1_i}, X_{2_i}) \log_2 \left( \frac{P(X_{1_i}, X_{2_i})}{P(X_{1_i}) P(X_{2_i})} \right)$$

This I does not map to $I_{n,m}$ up above; this is a sub-component starting point. It lacks "direction" or an algebraic sign. It tells us the magnitude if the direction but not whether it is positive or negative. We add the direction below in the term labeled D.

Given two decomposed datasets X and Y, the facility decomposes variables as shown in FIG. 4 and described in its description into binary categories to simplify and asses the direction, positive or negative, of the interrelatedness. Each data set consists of N major variables, each decomposed into $z_1, z_2, \ldots, z_N$ minor variables:

$$X = \{X_{1_1}, \ldots X_{1_{z_1}}, X_{2_1}, \ldots, X_{2_{z_2}}, \ldots, X_{N_1}, \ldots, X_{N_{z_N}}\}$$

-continued
$$Y = \{Y_{1_1}, \ldots Y_{1_{z_1}}, Y_{2_1}, \ldots, Y_{2_{z_2}}, \ldots, Y_{N_1}, \ldots, Y_{N_{z_N}}\}$$

The marginal dissimilarity for the $n^{th}$ variable is defined as:

$$G(X_n, Y_n) = \frac{1}{z_n} \sum_{i=1}^{z_n} KL(X_{n_i}, Y_{n_i}).$$

The interaction dissimilarity for the $n^{th}$ variable is defined by: First calculating all of the mutual information between all variables in Y and X:

$$I(Y_{n_i}, Y_{m_j}) \text{ and } I(X_{n_i}, X_{m_j}) \text{ for all } n, m \in N \text{ and } i \in z_n, t \in z_m;$$

Second calculating each covariance between all variables in Y and X:

$$Cov(Y_{n_i}, Y_{m_j}) \text{ and } Cov(X_{n_i}, X_{m_j}) \text{ for all } n, m \in N \text{ and } i \in z_n, t \in z_m;$$

Then calculating the direction modifier as:

$$D(n_i, m_j | X, Y) = \text{sign}(Cov(X_{n_i}, X_{m_j}) \cdot Cov(Y_{n_i}, Y_{m_j}));$$

Then combining D, with the I above in this section to get the H function from above in the generalized equation section, the interaction dissimilarity is then:

$$H(X_n, Y_n) = \frac{1}{z_n} \sum_{i=1}^{z_n} \left( \frac{1}{N-1} \sum_{\substack{j=1 \\ j \neq n}}^{N-1} \left[ \frac{1}{z_j} \sum_{k=1}^{z_j} \text{abs}(I(X_{n_i}, X_{j_k}) - D(n_i, j_k) \cdot I(Y_{n_i}, Y_{j_k})) \right] \right)$$

The summation sign inside the square brackets averages one binary variable with one other binary variable (e.g., binary age category under age 30 across all binary categories of marital status). The second summation sign, just outside the square brackets averages interaction differences across all variables. The third summation sign, the one outside the parenthesis and brackets, averages all age category breaks (i.e., age under 30, age under 31, age under 32, etc). This results in one average interaction dissimilarity measure for each variable (e.g., age, gender, church attendance, etc.).

The total set dissimilarity is then:

$$T(X, Y) = \frac{1}{N} \sum_{i=1}^{N} \sqrt{G(X_i, Y_i)^2 + H(X_i, Y_i)^2}$$

This is the average dissimilarity each variable is from the origin, where the origin is (0, 0) implying no dissimilarity in any variable's proportionate distribution or in any variables interrelatedness.

Returning to FIG. 2, in step 241, the facility generates a decision tree to identify a system of partitions that minimize the total set dissimilarity. In some embodiments, the facility defines an optimal set of partitions for each n exhaustive and mutually exclusive set of binary partitions or a subset of the total data set universe categorized into exhaustive and mutually exclusive binary categories. In some embodiments, the facility approximates the optimal solution without using one or more of these observations or partitions.

The facility uses a decision tree structure to define the optimal adjustment partitions which minimize the total dissimilarity between the reference and subject data sets when adjusted. In some embodiments, the facility uses varying combinations of tree-defining parameters that determine the tree's structure. For example, tree-defining parameters may include:
1. The maximum number of terminal nodes
2. The maximum number of variables needed to define a given terminal node
3. The minimum number of observations required for a terminal node to be considered
4. The minimum number of observations required in one or more node in order for a split to be considered In various embodiments, the facility uses one or more additional tree-defining parameters, such as the minimum number of nodes, minimum percentage of observations needed to define a given node, the minimum reduction in total dissimilarity accounted for by the additional node, etc.

In some embodiments, the facility finds the optimal tree by a complete enumeration of all decision trees possibilities and choosing the one that yields the minimum total data set dissimilarity when leaves are adjusted. When there are a relatively large number of variables and large number of categories within these variables, the universe of all possible decision trees can be very large. For large collections of variables where complete enumeration is cumbersome, time consuming, or expensive, in some embodiments, the facility utilizes an evolutionary algorithm to find a decision tree that is near optimal.

Figure 6:
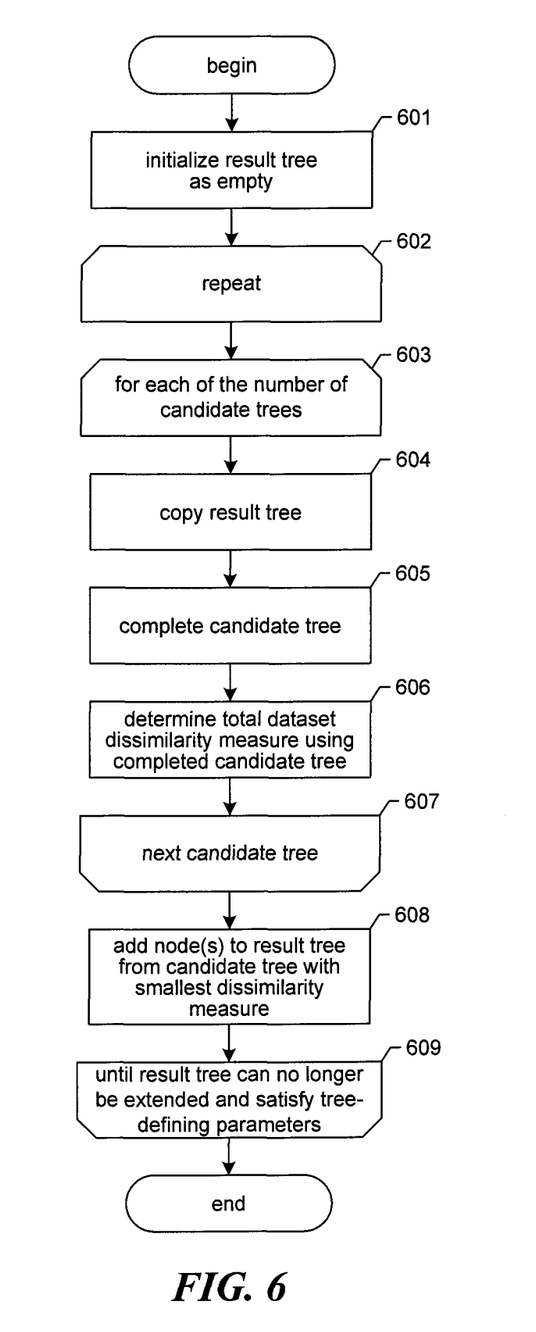
FIG. 6 is a flow diagram showing steps typically performed by the facility in some embodiments in order to generate a decision tree.

FIG. 6 is a flow diagram showing steps typically performed by the facility in some embodiments in order to generate a decision tree. In step 601, the facility initializes the result tree to be empty. The facility then repeats step 602-609 until the result tree can no longer be extended and still satisfies the tree-defining parameters identified above. In steps 603-607, the facility loops through each of a number of candidate trees, such as 100. In step 604, the facility makes a copy of the result tree, which forms the basis of the current candidate tree. In step 605, the facility completes the candidate tree. Additional details about step 605 are discussed below in connection with FIG. 7. In step 606, the facility determines the total data set dissimilarity measure using the candidate tree completed in step 605. In step 607, if additional candidate trees remain to be constructed, then the facility continues in step 603, else the facility continues in step 608. In step 608, the facility adds to the result tree one or more nodes from the candidate tree determined in step 606 to have the smallest dissimilarity measure. In some embodiments, step 608 involves adding to the result tree all of the nodes of the best candidate tree from the level below the lowest level of the result tree. In some embodiments, step 608 involves adding only one node to the result tree, such as the first node added to the copy of the result tree as part of completing the best candidate tree. In step 609, if the result tree can be extended and still satisfied by the tree-defining parameters, then the facility continues in step 602 to construct another set of candidate trees based upon the result tree as expanded in step 608, else the steps conclude.

Figure 7:
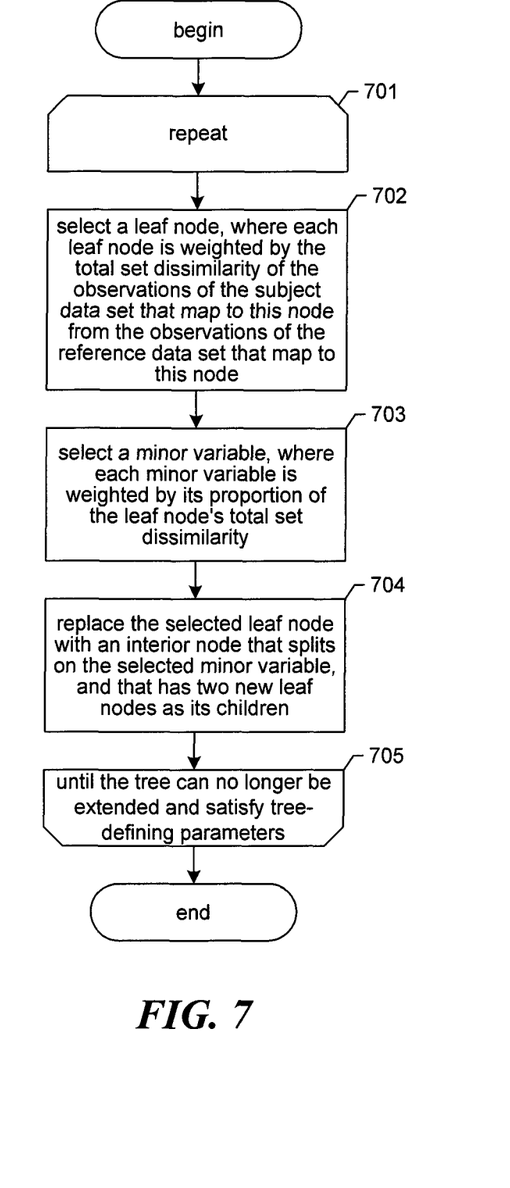
FIG. 7 is a flow diagram showing steps typically performed by the facility in order to complete a candidate tree in accordance with step 605 in some embodiments.

FIG. 7 is a flow diagram showing steps typically performed by the facility in order to complete a candidate tree in accordance with step 605 in some embodiments. The facility repeats step 701-705 until the candidate tree can no longer be extended and still satisfy the tree-defining parameters. In step 702, the facility selects a leaf node of the candidate tree, such as by selecting it stochastically. For this selection, each leaf node is weighted by the total set dissimilarity of the observations of the subject data set that map to this leaf node when compared to the observations of the reference data set that map to this leaf node. An observation maps to the leaf node if the observation has binary, i.e. minor, variable values that are consistent with the path from the root of the tree to the leaf node in question. In step 703, the facility selects a minor variable, such as by selecting it stochastically. In some embodiments, in step 703, the facility selects a minor variable from many of those minor variables that are not already used in any of the existing interior nodes of the candidate tree that are on the path from the root node to the node in question. The selection of step 703 is performed using a weight for each of these minor variables that is based upon the proportion of the leaf node's total set dissimilarity that is attributable to the minor variable. In step 704, the facility replaces the leaf node selected in step 702 with a new interior node that splits on the minor variable selected in step 703, and that has two new leaf nodes as its children. In step 705, if the candidate tree can be further extended and still satisfy the tree-defining parameters, then the facility continues in step 701 to add another interior node to the candidate tree, else these steps conclude.

Figure 8:
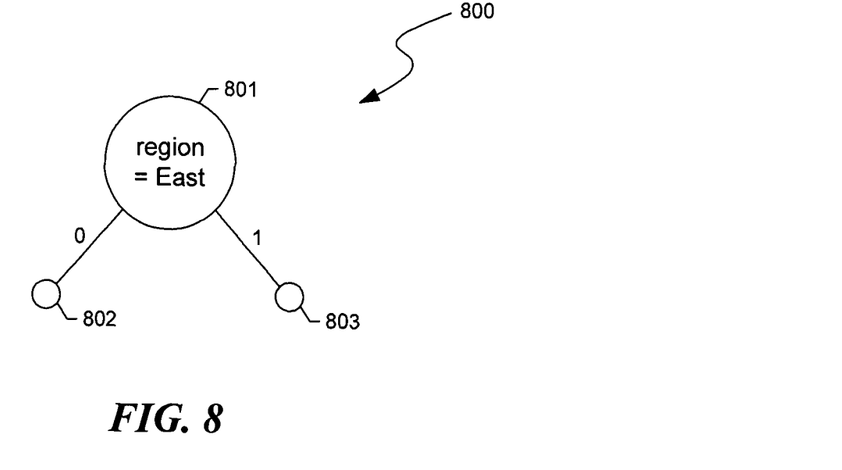
FIGS. 8 and 9 are data structure diagrams showing sample candidate decision trees during their construction by the facility.
Figure 9:
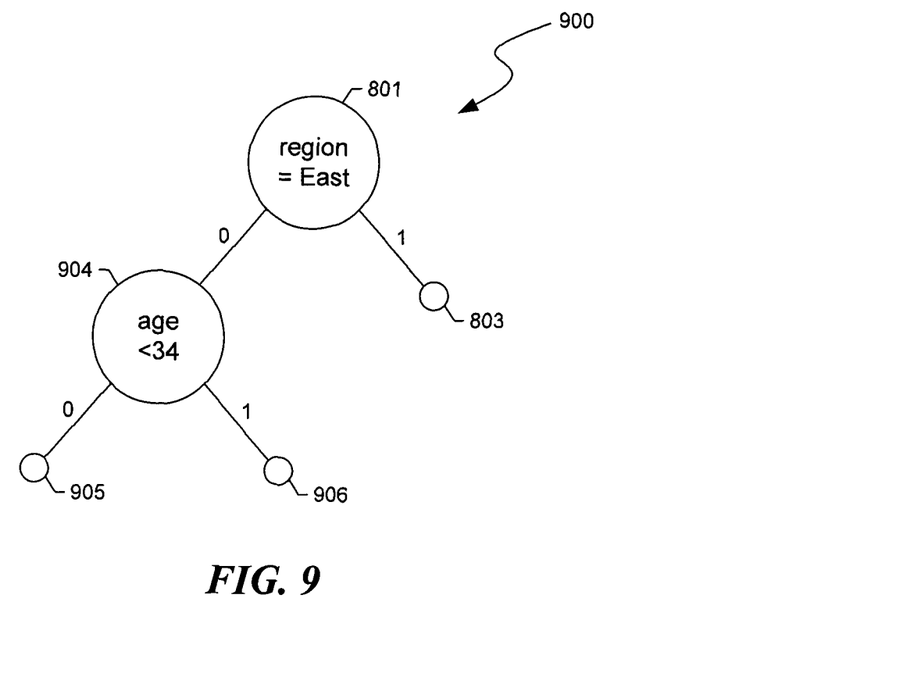

FIGS. 8 and 9 are data structure diagrams showing sample candidate decision trees during their construction by the facility. FIG. 8 shows a sample tree having a single interior node 801. Node 801 splits based upon whether each observation has a value for the region variable that is equal to East. Observations that do have value of the region variable that is equal to East map to leaf node 803, while observations that have a value of the region major variable that is West, North, or South map to leaf node 802. In a situation in which tree 800 is the current state of the result tree being constructed by the facility in accordance with FIG. 6, the facility copies this result tree as the basis for each of the number of candidate trees. As part of completing one of these candidate trees, the facility extends this candidate tree in step 704 as shown in FIG. 9.

FIG. 9 is a data structure diagram showing a sample expanded decision tree. To construct this expanded decision tree, the facility has selected leaf node 802 in step 702 and has selected an age<34 minor variable in step 703. The facility subsequently replaced leaf node 802 with new interior node 904 representing the selected split. Tree 900 has two additional leaf nodes 905 and 906 as children of new interior node 904. An observation maps to leaf node 905 if it has a value of zero for the region=East minor variable and a value of zero for the age<34 minor variable. That is to say, an observation maps to leaf node 905 if its value for the region major variable is West, North, or South, and its value for the age major variable is greater than or equal to 34. An observation maps to leaf node 906 if its value for the region=East minor variable is zero and its value for the age<34 minor variable is 1. At the point depicted in FIG. 9, the facility would continue to expand the shown candidate tree until it could no longer be extended and still satisfy the tree-defining parameters.

Returning to FIG. 2, in one or more of steps 251-253, the facility employs the decision tree generated in step 241 to reduce the dissimilarity of the subject data set with the reference data set. In step 251, the facility removes excess observations from the subject data set to better match the reference data set. That is, for any leaf nodes of the decision tree where the proportion of the observations of the subject data set that map to the node exceeds the proportion of observations of the reference data set that map to that node, the facility removes observations of the subject data set that map to that node until this condition no longer exists, or exists only to a degree that is below a predetermined threshold. After the removal of these observations of the subject data set, the dissimilarity of the subject data set with the reference data set has been reduced. At this point, the facility assembles the survey responses of the observations that have not been discarded.

In step 252, the facility weights the observations of the subject data set such that, for each leaf node of the decision tree, the proportion of observations of the subject data set that map to that node when weightings are considered is equal or nearly equal to the proportion of observations of the reference data set that map to that node. At this point, the facility uses the responses of all of the observations in the subject data set, weighted in accordance with the weightings applied in step 252. For example, if an observation had a value of male for the sex variable and was attributed a weighting of 0.25, this observation would contribute 0.25 to the aggregated male value of the sex variable for the subject data set. Similarly, if this observation has a yes value for the enjoy animated films variable, the observation will contribute 0.25 value to an aggregated value for this variable for the subject data set.

In step 253, the facility collects a new data set from the provider of the subject data set using strata defined by the decision tree generated by the facility. Step 253 is similar to step 251, but rather than discarding excess observations that correspond to complete responses, omits to accept partial responses that are determine to correspond with excess observations. That is, during completion of a survey, the facility uses the variable values provided by the respondent so far to attempt to determine which leaf node of the decision tree the response would map to. If this is a node to which a significantly higher proportion of observations of the subject data set map than the proportion of observations of the reference data set due, then the facility interrupts the completion of the survey by this respondent, such that a subject data set having a low level of dissimilarity with the reference data set is collected in the first instance. In this instance, the facility simply uses the survey responses contained in the subject data set without alteration.

Survey results produced and/or adjusted in accordance with the facility may be used in a variety of ways, including using the survey result internally, selling the survey result, constructing the marketing report around the survey result, combining the survey result with other results for the same or similar surveys, etc.

In some embodiments, the facility generates or uses a decision tree that is not uniformly binary—that is, at least one non-leaf node has more than two children, where such nodes partition the possible values of an attribute into more than two categories.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-readable storage device whose contents cause a computing system to perform a method for adjusting with respect to a plurality of attributes each having a plurality of possible values a set of survey responses each from a survey respondent and each specifying an answer to each of one or more survey questions, the method comprising:

for each of the survey respondents, accessing a value for each of the plurality of attributes;

for each of the plurality of members of a modeled population, accessing a value for each of the plurality of attributes;

initializing a decision tree to contain a single node that is both a root node and a leaf node;

completing the initialized decision tree by adding interior nodes to the decision tree that each reduce the total dissimilarity measure between the reference and subject data sets by specifying a partitioning of the possible values of one of the plurality of attributes, wherein the dissimilarity measure of each leaf node is determined based on the level of dissimilarity of the attribute values of the survey respondents whose attribute values satisfy any partitionings specified by interior nodes on the path from the root node to the leaf node with the attribute values of the members of the modeled population whose attribute values satisfy any partitionings specified by interior nodes on the path from the root node to the leaf node;

for each of the leaf nodes in the completed decision tree:
identifying any members of the modeled population whose attribute values satisfy the partitionings specified by the path within the tree from its root node to the leaf node,
identifying any survey respondents whose attribute values satisfy the partitionings specified by the interior nodes on the path from the root node to the leaf node, and
determining a ratio of the number or proportion of members of the modeled population identified for the leaf node to a number of survey respondents identified for the leaf node;

for each of the survey responses, adjusting each answer to a survey question specified by the survey response by a factor based upon the ratio determined for the leaf node for which the survey respondent from whom the survey response was received was identified.

2. A method in a computing system for generating a binary partitioning decision tree with respect to a pair of groups each comprising a plurality of entities, each of the entities having, for each of a plurality of variables, a value among a set of possible values, comprising:

initializing a decision tree to contain a single node that is both a root node and a leaf node; and
completing the initialized decision tree by repeatedly, until one of one or more limits on the extent of the decision tree is reached:
for each of the leaf nodes in the decision tree:
identifying any entities of the first group whose variable values satisfy any partitionings specified by interior nodes on the path within the tree from its root node to the leaf node;
identifying any entities of the second group whose variable values satisfy any partitionings specified by interior nodes on the path from the root node to the leaf node; and
attributing a weighting to the leaf node that is based on a measure of the dissimilarity of the variable values of the entities of the first group identified for the leaf node with the variable values of the entities of the second group identified for the leaf node relative to a measure of the dissimilarity of the variable values of all of the entities of the first group with the variable values of all of the entities of the second group,
stochastically selecting one of the leaf nodes of the tree in accordance with the weightings attributed to the leaf nodes,
attributing a score to each possible partitioning of the possible values of each of the plurality of variables that is based on, if a new node specifying the possible partitioning and having first and second child nodes was substituted for the selected leaf node, (1) a dissimilarity measure of the variable values of the entities of the first group whose variable values satisfy any partitionings specified by interior nodes on the path from the root node to the first child node with the variable values of the entities of the second group whose variable values satisfy any partitionings specified by interior nodes on the path from the root node to the first child node and (2) a dissimilarity measure of the variable values of the entities of the first group whose variable values satisfy any partitionings specified by interior nodes on the path from the root node to the second child node with the variable values of the entities of the second group whose variable values satisfy any partitionings specified by interior nodes on the path from the root node to the second child node,
stochastically selecting one possible partitioning of the possible values of one of the variables in accordance with the scores attributed to the partitionings, and
replacing the selected leaf node with a new interior node, the interior node having as children two new leaf nodes and branching among its children based upon the selected partitioning.

3. The method of claim 2 wherein each of the entities is a person.

4. The method of claim 2 wherein the dissimilarity measures incorporate both (1) a marginal distribution of each attribute among entities of the first group and among entities of the second group, and (2) each attribute's interrelation with every other variable among entities of the first group and among entities of the second group.

5. The method of claim 2 wherein the selected possible partitioning is selected by stochastically selecting a possible partitioning in accordance with the scores attributed to the possible partitionings.

6. The method of claim 2 wherein the selected possible partitioning is selected by selecting the possible partitioning to which the highest score is attributed.

7. A method in a computing system for adjusting survey responses from a subject group of individuals with reference to a reference group of individuals, comprising:
constructing a decision tree that classifies individuals into categories based on each individual's values for a plurality of attributes;
for each category, using the ratio of the number of individuals of the reference group classified into the category to the number of individuals of the subject group classified into the category to adjust both attributes and survey responses from the individuals of the subject group classified into the category; and
determining a dissimilarity measure between the adjusted attributes of the individuals of the subject group and the attributes of the individuals of the reference group that is smaller than a dissimilarity measure between the pre-adjusted attributes of the subject group with the attributes of the reference group.

8. A method of claim 7 wherein the categories into which the constructed decision tree classifies individuals each correspond to a leaf node of the decision tree.

9. The method of claim 7 wherein at least a portion of the categories into which the constructed decision tree classifies individuals each correspond to a non-leaf node of the decision tree.

10. The method of claim 7 wherein the attribute values for individuals of the subject group were received from a selected source, the method further comprising, after the decision tree is constructed:

for each category, storing the fraction of the individuals of the subject group that are classified into the category by the decision tree;

receiving from the selected source attribute values for a further plurality of individuals;

using the constructed decision tree to classify the further plurality of individuals; and for each category, determining the fraction of the further plurality of individuals of the subject group that are classified into the category by the decision tree; and determining the extent to which the fractions determined for the further plurality of individuals deviate from the fractions stored for the individuals of the subject group.

11. The method of claim 10, further comprising, where the determined extent exceeds a threshold, causing a new decision tree to be constructed is based at least in part on the attribute values received for the further plurality of individuals.

12. The method of claim 10, further comprising, where the determined extent exceeds a threshold, causing a new decision tree to be constructed based on attribute values received from an additional plurality of individuals that does not intersect with the reference group of individuals, the subject group of individuals, or the further plurality of individuals.

13. The method of claim 7 wherein the dissimilarity measures incorporate both (1) a marginal distribution of each attribute among individuals of the subject group and among individuals of the reference group, and (2) each attribute's interrelation with every other variable among individuals of the subject group and among individuals of the reference group.

14. The method of claim 7 further comprising ascribing non-uniform weights to the attributes of the plurality, and wherein the dissimilarity measures are based on the weight ascribed to each attribute.

15. The method of claim 12, further comprising receiving user input specifying the weights for at least a portion of the attributes of the plurality.

16. The method of claim 7, further comprising compositing the subject group from two or more constituent groups before constructing the decision tree.

17. The method of claim 7, further comprising compositing the reference group from two or more constituent groups before constructing the decision tree.

18. The method of claim 7 wherein the adjustment comprises, for each of at least one of the categories, discarding the survey responses from at least one of the individuals of the subject group classified into the category from the subject group.

19. The method of claim 7 wherein the adjustment comprises determining non-uniform weights for the survey responses from the individuals of the subject group depending on their attribute values and the categories into which they are classified.

20. The method of claim 7, further comprising collecting a new subject data set in accordance with the constructed decision tree.

21. The method of claim 7 wherein constructing a decision tree comprises:

exhaustively constructing every possible decision tree as a candidate tree;

for each candidate tree, determining a score for the candidate tree that incorporates, for each of the categories into which the candidate tree classifies individuals, a measure of the dissimilarity of the attribute values of the individuals of the subject group classified into the category with the attribute values of the individuals of the reference group classified into the category; and selecting the candidate tree having the score reflecting the lowest level of overall dissimilarity.

22. The method of claim 7 wherein constructing a decision tree comprises:

initializing a result tree to have a single node that is a leaf node;

until the result tree is completed:
for each of a plurality of candidate trees:
initializing the candidate tree to be a copy of the result tree;
until the candidate tree is completed:
using weighted stochastic selection to select one of the leaf nodes of the candidate tree and to select a possible partitioning of the possible values of one of the attributes;
substituting for the selected leaf node an interior node specifying the selected partitioning;
establishing two new leaf nodes as children the substituted interior node; and
determining a score for the completed candidate tree that incorporates, for each of the categories into which the candidate tree classifies individuals, a measure of the dissimilarity of the attribute values of the individuals of the subject group classified into the category with the attribute values of the individuals of the reference group classified into the category;
selecting the candidate tree having the score reflecting the lowest level of overall dissimilarity; and
copying at least one interior node from the selected candidate tree to the result tree.

23. A computer-readable storage device whose contents are capable of causing a computing system to perform a method for adjusting data sets among a first data set of individuals and a second data set of individuals, the method comprising:

constructing a decision tree that classifies individuals into categories based on each individual's values for a plurality of attributes;

for each category, using the ratio of the number of individuals of the first data set classified into the category to the number of individuals of the second data set classified into the category to adjust one or more individuals of at least one of the first data set and the second data set classified into the category; and determining a total dissimilarity measure between the attributes of the individuals of the first data set after any adjustment and the attributes of the individuals of the second data set after any adjustment that is smaller than a dissimilarity measure between the attribute values of the individuals of the first data set before any adjustment and the attribute values of the individuals of the second data set before any adjustment.

24. The computer-readable storage device of claim 23 wherein the adjustment adjusts at least one individual of the first data set and at least one individual of the second data set.

25. The computer-readable storage device of claim 24 wherein the first data set is composited from two or more constituent data sets.

26. The computer-readable storage device of claim 23 wherein the adjustment comprises, for at least one of the categories, discarding at least one of the individuals of at least one of the first data set and the second data set that are classified into the category from the subject group.

27. The computer-readable storage device of claim 23 wherein the adjustment comprises determining non-uniform weights for the individuals of the first data set and the second data set depending on their attribute values and the categories into which they are classified.

28. A computer-readable storage device whose contents are capable of causing a computing system to perform a method for combining a plurality of subject groups with respect to a reference group, each group comprising a plurality of entities, each of the entities having, for each of a plurality of variables, a value among a set of possible values, the method comprising:
 experimentally selecting a plurality of sets of weights for each of the subject groups;
 for each selected set of weights:
  applying the weights to the variable values of each of the subject groups;
  combining the entities of the subject groups having the weighted variable values into a combined subject group;
  determining a dissimilarity measure for the set that measures how dissimilar the weighted variable values of the entities of the combined subject group are from the variable values of the entities of the reference group; and
 storing the combined subject group generated using the set of weights having the smallest dissimilarity measure.

29. The computer-readable storage device of claim 28 wherein the dissimilarity measures incorporate both (1) a marginal distribution of each variable among entities of the combined subject group and among entities of the reference group, and (2) each variable's interrelation with every other variable among entities of the first group and among entities of the second group.

30. The computer-readable storage device of claim 28 wherein the experimental selection of the plurality of sets of weights is performed using a particle swarm optimization algorithm.

31. A method in a computing system for dividing a pool of entities into two groups that are balanced on a set of attributes, each of the entities of the pool having a value for each attribute of the set, comprising:
 repeating:
  establishing an allocation of the pool that allocates each of the entities to one of the two groups, and
  determining a measure of the dissimilarity of the attribute values of the individuals of the two groups that incorporates both (1) a marginal distribution of each attribute among individuals of each of the two groups, and (2) each attribute's interrelation with every other variable among individuals of each of the two groups until the last-determined measure is within a preselected threshold; and
 selecting the last established location; and
 for a distinguished established allocation, constructing a decision tree that classifies entities into categories based on each entity's values for the attributes of the set, such that, for each of the categories, a measure of the dissimilarity of the attribute values of the entities of the two groups classified into the category is smaller than a measure of the dissimilarity of the attribute values of all of the entities of the two groups, and wherein the establishment of the allocation following the allocation involves exchanging between the groups of the selected allocation one or more pairs of entities classified into the category having the highest measure of dissimilarity.

32. The method of claim 31 wherein each individual is a person.

33. The method of claim 31, further comprising using the selected allocation as a basis for assigning the individuals to control and test groups for a medical clinical trial.

34. The method of claim 31 wherein each allocation is established randomly.

35. The method of claim 31 wherein each allocation is established stochastically.

36. The method of claim 31 wherein each allocation is established deterministically.

\* \* \* \* \*